(12) United States Patent
Schackow et al.

(10) Patent No.: US 7,870,596 B2
(45) Date of Patent: *Jan. 11, 2011

(54) ACCESSING NETWORK RESOURCES OUTSIDE A SECURITY BOUNDARY

(75) Inventors: Stefan N. Schackow, Bellevue, WA (US); Nikhil Kothari, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 749 days.

This patent is subject to a terminal disclaimer.

(21) Appl. No.: 11/670,135

(22) Filed: Feb. 1, 2007

(65) Prior Publication Data

US 2008/0189757 A1 Aug. 7, 2008

(51) Int. Cl.
G06F 13/00 (2006.01)
H04L 29/06 (2006.01)
(52) U.S. Cl. .............. 726/1; 726/2; 726/3; 726/22; 726/27; 713/152; 709/217; 709/229
(58) Field of Classification Search .............. 726/1, 726/2, 3, 22, 27; 713/151, 152; 707/10, 707/705, 781, 283; 709/217, 219, 223, 225, 709/229
See application file for complete search history.

(56) References Cited

U.S. PATENT DOCUMENTS

| | | | |
|---|---|---|---|
| 6,192,476 B1 | 2/2001 | Gong | |
| 6,199,181 B1 | 3/2001 | Rechef | |
| 6,272,641 B1 | 8/2001 | Ji | |
| 6,691,230 B1 * | 2/2004 | Bardon | 726/27 |
| 6,832,239 B1 * | 12/2004 | Kraft et al. | 709/203 |
| 7,444,678 B2 * | 10/2008 | Whitmer et al. | 726/22 |
| 7,669,227 B2 * | 2/2010 | Malcolm | 726/1 |
| 2004/0006706 A1 | 1/2004 | Erlingsson | |
| 2007/0169168 A1 * | 7/2007 | Lim | 726/1 |
| 2008/0189767 A1 * | 8/2008 | Kothari et al. | 726/4 |

OTHER PUBLICATIONS

U.S. Appl. No. 11/670,142, mail date Oct. 30, 2009, Office Action.
U.S. Appl. No. 11/670,142, mail date May 13, 2010, Office Action.
Related U.S. Appl. No. 11/670,142, filed Feb. 1, 2007 (Not Yet Published).
"White Paper, Adobe AIR Security", Adobe AIR beta 3 release draft, Dec. 14, 2007, Adobe Systems Incorporated.

(Continued)

*Primary Examiner*—Ian N Moore
*Assistant Examiner*—Daniel Potratz
(74) *Attorney, Agent, or Firm*—Workman Nydegger (57) ABSTRACT

The present invention extends to methods, systems, and computer program products for accessing network resources outside a security boundary. The present invention can provide a modules running within a security boundary (e.g., sandboxed client-side scripts) access to network resources at computer systems other than the computer system where the module originated. When network access is permitted, the properties of network request can be adjusted so that security information of the client system and the originating computer system for the module are not divulged. Thus, a module can obtain content for inclusion in a Web page from third party servers in a more secure meaner. Network e access decisions can be made based on ambient data already accessible to a host environment such that network access decisions can be made in a more automated manner.

15 Claims, 5 Drawing Sheets

OTHER PUBLICATIONS

Gong, Li, "Java 2 Platform Security Architecture", Version 1.2, Copyright 1997-2002 Sun Microsystems Inc., http://java.sun.com/j2se/1.4.2/docs/guide/security/spec/security-spec.doc.html—Downloaded Jul. 30, 2008.

Gary McGraw and Edward Felten, "Understanding the Keys to Java Security—The Sandbox and Authentication" JavaWorld.com, May 1, 1997, http://www.javaworld.com/cgi-bin/mailto/x_java.cgi—Downloaded Jul. 30, 2008.

* cited by examiner

ACCESSING NETWORK RESOURCES OUTSIDE A SECURITY BOUNDARY

CROSS-REFERENCE TO RELATED APPLICATIONS

Not Applicable.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing components.

One common form of network based communication is exchanging electronic messages on the Worldwide Web ("WWW"). Content on the Worldwide Web is typically accessed in a client/server model. A "Web browser" of a client computer system sends a request to access content that is provided by a "Web Server" of a server computer system (e.g., by entering a Uniform Resource Locator ("URL") into the Web browser). If the user of the Web browser is authorized to access the content, the Web server typically provides the content to the Web browser. In a Web environment, content and requests for content, are frequently transported using Hypertext Transfer Protocol ("HTTP"). Web-based content can be provided in HyperText Markup Language ("HTML") pages, style sheets, images, scripts, etc.

Scripts are executable code that is sent from a Web server to a Web browser. Scripts can be executed at the Web browser to assist in providing requested content. For example, a script may access a current time from the system clock of a client computer system and display the current time intermingled with other received content from the Web server.

However, there is typically limited (if any) notion of pre-established trust between different computer systems on the Internet. Thus, executable code received over the Internet is frequently under suspicion for including malicious functionality, such as, for example, viruses, key loggers, spyware, Trojan horses, etc. Further, there is typically, limited, if any, mechanisms for determining what a portion of executable code will do before it is executed. Thus, executable code received over the Internet from an originating server is typically not given any access to resources of any other servers. In many environments, client side executable code received from an originating server is prevented from communicating with and accessing content from other servers.

Different security mechanisms can be employed to limit subsequent network access for specified executable code received from a server. One mechanism frequently utilized in Web based environments, is to execute code, such as, for example, a script, within a security boundary (sometimes referred to as a "sandbox"). A limited set of resources is allocated for use within the security boundary such that if a script does include malicious code, execution of the malicious code does not impact resources outside of the security boundary. For example, a client side script running in a sandbox is typically prevented from network communication with any server other than the originating server (i.e., the server that sent the client side script to the client). Thus, when a client side script is running in a sandbox, network resources at any server other than the originating server are typically completely inaccessible to the client side script.

Unfortunately, there are also many applications, for example, rich internet applications ("RIAs") that have legitimate needs for executing scripts that access resources from other servers. However, even though these types of applications may be of benefit to a user, the user may still choose to sandbox these types of applications (thus, preventing communicating with any server other than the originating server) or just not use them, due to general security concerns related to executable code received over the Internet.

BRIEF SUMMARY

The present invention extends to methods, systems, and computer program products for accessing network resources outside a security boundary. A host environment (e.g., a Web browser) sends a (e.g., Web) page request to an originating computer system (e.g., a first Web server). The host environment receives a page from the originating computer system in response to the page request. The page includes a network based application (e.g., a client side script) that is configured to provide at least a portion of the content of the page. The host environment runs the network based application inside a security boundary (e.g., a sandbox) of the Web browser.

The network based application running inside the security boundary sends a network access request. The network access request requests network communication (e.g., to retrieve content for the page) be implemented with an external computer system (e.g., a second different Web server) outside of the security boundary.

A network access abstraction layer in the host environment receives the network access request from the network based application running inside the security boundary. The network access abstraction layer accesses network security policies that control access to external computer systems. The network security policies are configured to make a network access decision for the network access request based on network access information corresponding to the network access request. The network access abstraction layer accesses network access information associated with the network access request. The network access information includes at least one property of a setting for the host environment and at least one property of the network access request.

The network access abstraction layer applies the network security polices to the network access information to make a network access decision for the received network request. For example, the network access abstraction layer can permit the request, either with the requested access or adjusted access, or deny the request. The network access abstraction layer returns the network access decision to the network based application to indicate to the network based application whether or not the network based application is permitted to implement the requested network access outside of the security boundary.

When it is determined that the requested network access is to be permitted, the network access abstraction layer permits (potentially adjusted) network communication from the network based application to the corresponding external computer system. The network abstraction layer indicates to the network based application that network access to the external computer system has been permitted.

The network based application running inside the security boundary receives the indication that network access to the external computer system has been permitted. The network based application running inside the security boundary retrieves content from the external computer system outside the security boundary for inclusion in the page. Accordingly, the network based application is permitted to retrieve content from a computer system other than the computer system that sent the network based application to be run within the hosted environment.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for accessing network resources outside a security boundary. A host environment (e.g., a Web browser) sends a (e.g., Web) page request to an originating computer system (e.g., a first Web server). The host environment receives a page from the originating computer system in response to the page request. The page includes a network based application (e.g., a client side script) that is configured to provide at least a portion of the content of the page. The host environment runs the network based application inside a security boundary (e.g., a sandbox) of the Web browser.

The network based application running inside the security boundary sends a network access request. The network access request requests network communication (e.g., to retrieve content for the page) be implemented with an external computer system (e.g., a second different Web server) outside of the security boundary.

A network access abstraction layer in the host environment receives the network access request from the network based application running inside the security boundary. The network access abstraction layer accesses network security policies that control access to external computer systems. The network security policies are configured to make a network access decision for the network access request based on network access information corresponding to the network access request. The network access abstraction layer accesses network access information associated with the network access request. The network access information includes at least one property of a setting for the host environment and at least one property of the network access request.

The network access abstraction layer applies the network security polices to the network access information to make a network access decision for the received network request. For example, the network access abstraction layer can permit the request, either with the requested access or adjusted access, or deny the request. The network access abstraction layer returns the network access decision to the network based application to indicate to the network based application whether or not the network based application is permitted to implement the requested network access outside of the security boundary.

When it is determined that the requested network access is to be permitted, the network access abstraction layer permits (potentially adjusted) network communication from the network based application to the corresponding external computer system. The network abstraction layer indicates to the network based application that network access to the external computer system has been permitted.

The network based application running inside the security boundary receives the indication that network access to the external computer system has been permitted. The network based application running inside the security boundary retrieves content from the external computer system outside the security boundary for inclusion in the page. Accordingly, the network based application is permitted to retrieve content from a computer system other than the computer system that sent the network based application to be run within the hosted environment.

Embodiments of the present invention may comprise a special purpose or general-purpose computer including computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, computer-readable media can comprise physical (or recordable type) computer-readable storage media, such as, RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

In this description and in the following claims, a "network" is defined as one or more data links that enable the transport of electronic data between computer systems and/or modules.

When information is transferred or provided over a network or another communications connection (either hardwired, wireless, or a combination of hardwired or wireless) to a computer, the computer properly views the connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Computer-executable instructions comprise, for example, instructions and data which cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
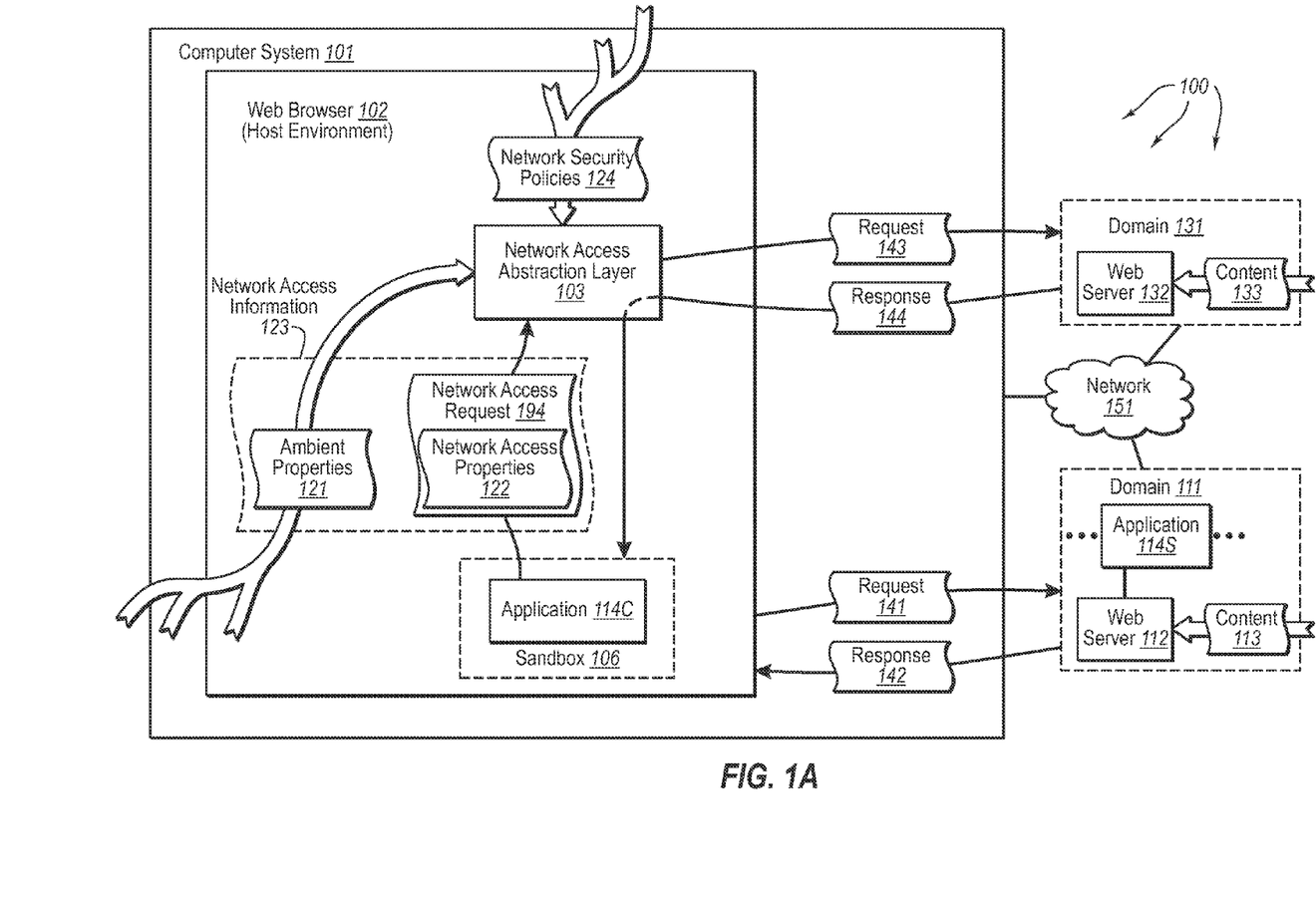
FIG. 1A illustrates an example computer architecture that facilitates network access outside a security boundary.

FIG. 1A illustrates an example computer architecture 100 that facilitates accessing network resources outside a security boundary. Computer architecture 100 includes computer system 101, network 151, domain 111, and domain 131. Depicted in computer architecture 100 are various components including, Web browser 102 (or alternately some other type of host environment), network access abstraction layer application 114C, application 114S, Web server 112, and Web server 132. Each of the various components can be connected to network 151, such as, for example, a Local Area Network ("LAN"), a Wide Area Network ("WAN"), or even the Internet. Thus, the various components can receive data from and send data to other components connected to the network. Accordingly, the components can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network. For example, components can exchange HTTP requests and responses and Simple Object Access Protocol ("SOAP") envelopes containing Web service related data.

In some embodiments, application 114C and application 114S are different portions of a distributed application, such as, for example, a Web services application. However, application 114C can be virtually any type of application and can include virtually any type of executable code. Further, application 114C need not necessarily even be related to application 114S.

Domains 111 and 131 can be identified by a domain name, such as, for example, a domain name service ("DNS") name that is resolvable to an IP address. The domain name can be entered into a Web browser (potentially along with other identifying information for a specified application within domain 111 or domain 131) to direct a browser to request content from Web server 112 or Web server 132 respectively. A domain name along with other identifying information can be included in a Uniform Resource Locator ("URL") entered into a Web browser. Depending on a type of request and/or a received URL, Web server 112 can access content from content 113 and/or initiate a Web-based application, such as, for example, application 114S. Application 114S can request data from other locations in domain 111, such as, for example, from file stores, databases (e.g., a SQL or other relational database), etc. Web server 112 can include content from content 113 and/or other locations in a response to a Web browser request. Web server 112 can also send executable code (e.g., scripts or other computer-executable instructions) to a Web browser in response to a request.

Web browser 102 can be configured to request Web-based content from domains, such as, for example, domains 111 and 131, accessible via network 151. Web-based content can include text data, image data, audio/video data, executable code, etc. When executable code is received, for example, a Web-based application, the executable code can be executed within Web browser 102. Web-based applications can request access to content at other computer systems connected to network 151.

Thus, for example, it may be that Web browser 102 sends requests 141 (an HTTP get) to domain 111 (by utilizing an appropriate URL for domain 111). Domain 111 can receive request 141 and direct request 141 to Web server 112. Web server 112 can process request 141 and generate/obtain corresponding content. The corresponding content can be returned to Web browser 102 in response 142 (an HTTP message). Response 142 can include application 114C that is to be executed at Web browser 102 to perform other operations and/or obtain further content related to request 141.

Application 114C can be executed within sandbox 106 (or some other security boundary) to mitigate the potential for harmful code included in application 114C (e.g., viruses, Trojan horses, spyware, etc.) gaining access to resources of computer system 101 or other computer system connected to network 151. Nonetheless, application 114C may request network access to content that is external to sandbox 106, such as, for example, content 133. When application 114C requests access to content that is external to sandbox 106, the request can be directed to network access abstraction layer 103. When configuring sandbox 106, Web browser 102 can specify that any network access requests originating in sandbox 106 are to be directed to network access abstraction layer 103.

Generally, network access abstraction layer 103 is configured to regulate inbound and outbound network based communication to and from applications, such as, for example, application 114C, within a security boundary. To facilitate regulation of network based communication, network access abstraction layer 103 can make network access decisions when a module (e.g., application 114C) within a security boundary (e.g., within sandbox 106) attempts to communicate with a computer system (e.g., Web server 132) outside the security boundary or vice versa.

Accordingly, network access abstraction layer 103 can modify outbound communication sent from an application within a security boundary to a computer system outside of the security boundary. For example, network access abstraction layer 103 can modify outbound communication (e.g., requests for Web based content) sent from application 114C and directed to Web server 132. Likewise, network access abstraction layer 103 can modify inbound communication sent from a computer system outside of the security boundary to a module within the security boundary. For example, network access abstraction layer 103 can modify inbound communication (e.g., requests for Web based content) sent from Web server 132 and directed to application 114C. In some embodiments, modifying inbound communication includes stripping any Set-Cookie headers from a Web server response prior to returning the response to application 114C.

Network access abstraction layer 103 can utilize network security policies and network access information when making a network access decision. Thus, a user or administrator can change network security polices and/or network access information to influence network access decisions.

Network security polices can be accessed from within Web browser 102, other locations at computer system 101 (e.g., a system registry or configuration file), and locations external to computer system 101 (e.g., through references to external program calls, etc.). Similarly, network access information can also be accessed from within Web browser 102 (e.g., in Web browser settings, in a network access request), other locations at computer system 101 (e.g., in system settings), and locations external to computer system 101 (e.g., from a distributed directory service, such as, in Active Directory ("AD"), Universal Description, Discovery and Integration ("UDDI"), etc.).

Figure 1B:
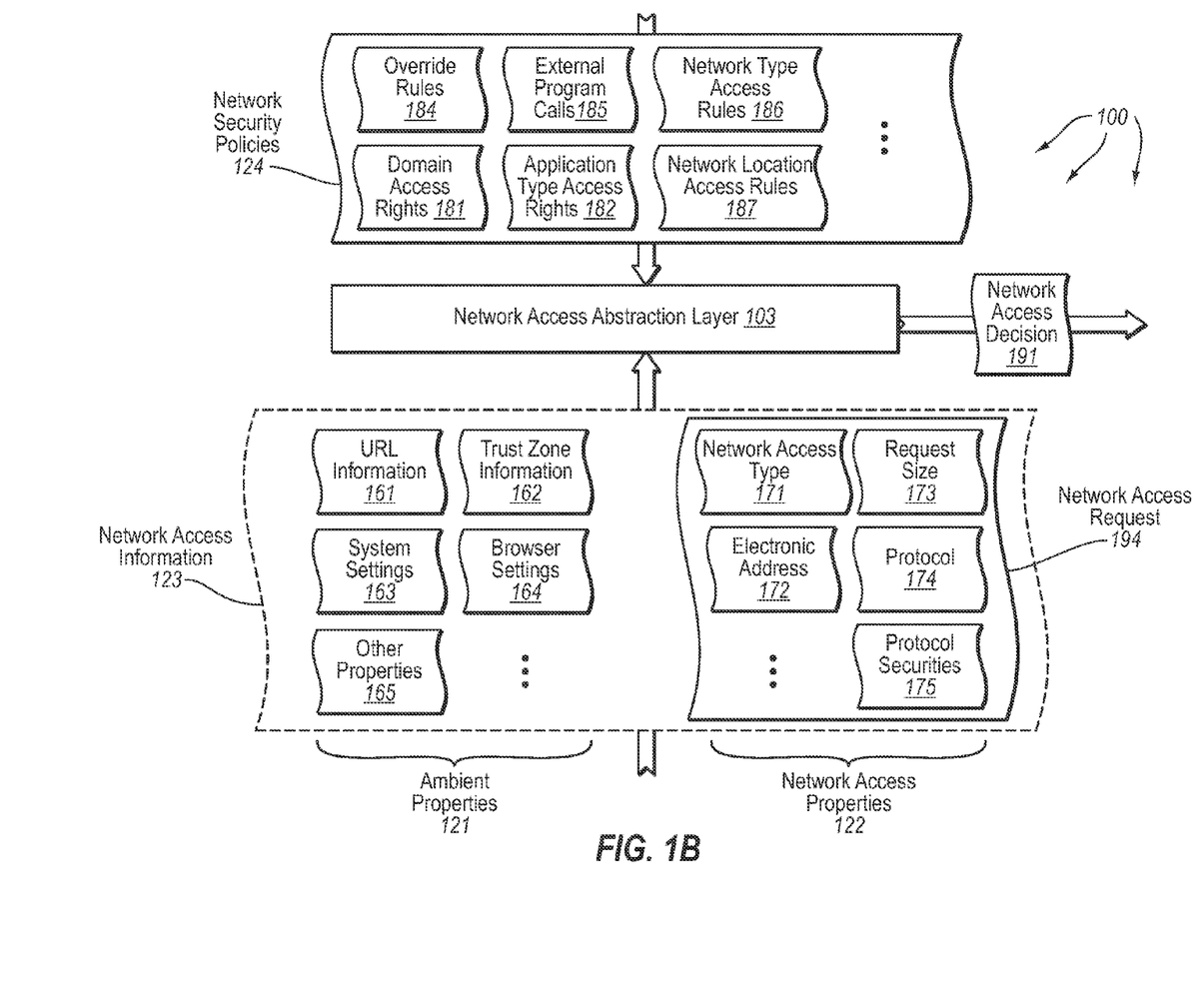
FIG. 1B illustrates some of the types of policies and information that can be used to make a network access decision.

Accordingly, various different types of network security policies can interoperate with various different types of network access information to make a network access decision, when a module inside a security boundary requests network access to content outside the security boundary. FIG. 1B illustrates some of the types of policies and information that can be used to make a network access decision.

Referring now to FIG. 1B, network security polices 124 can include a variety of different policies, such as, for example, computer-executable representing how to process and/or determine domain access rights 181, application type access rights 182, override rules 184, network type access rules 186, network location access rules 187, etc. External program calls 185 represent extensibility hooks to extend network security policies 124 and/or access additional decision logic. Override rules 184 can include user-entered network security polices that override other general network security polices, for example, to implement exceptions to other network security polices. A series of three periods (a vertical ellipsis) represents that other network security policies, in addition to those expressly listed, may also be accessible to network access abstraction layer 103.

In some embodiments, network access abstraction layer 103 may require additional security policy information to make a network access decision for a network access request. In these embodiments, Web browser 102 can present user-interface controls to a user prompting the user to enter additional network security policy information. Alternately, a user can expressly invoke user-interface controls to set network security polices for specified servers, such as, for example, indicating network access that is to be permitted and/or denying. User-entered network security polices can be appropriately maintained in any of the depicted types of file security polices 124 and/or maintained within a separate user-entered rules.

When appropriate, an administrator (e.g., of network 151) can adjust the behavior of network security polices (e.g., for a plurality of network computers) by changing configurable aspects of extensible security policy. For example, an administrator can adjust specific definitions of trust levels for servers.

Turning now to network access information, for a specified network access request, some network access information, hereinafter referred to as "network access properties", can be obtained from the network access request. Other network access information, hereinafter referred to as "ambient properties", can be obtained from locations other than the network access request. Ambient properties can be properties, such as, for example, Web browser properties, computer system properties, network properties, etc., that remain constant across a number of network access requests and/or that require express user interaction to alter. Ambient settings can be altered though appropriate user-interface controls of computer system 101 and Web browser 102.

Accordingly, network access information 123 can include ambient properties 121 and network access properties 122. Ambient properties 121 can include a variety of different types of information, such as, for example, URL information 161 (e.g., for a current page and a requested network resource), trust zone information 162 (e.g., for a current page and a requested network resource), system settings 163, browser settings 164, other properties 165, etc. The vertical ellipsis represents that other ambient properties, in addition to those expressly listed, may also be accessible to network access abstraction layer 103.

Network properties 122 includes essentially any information that can be contained in a network access request, such as, for example, network access type 171, electronic address 172 (e.g., of an external server), request size 173, protocol 174 (e.g., IP, TCP, HTTP, etc), protocol semantics 175 (e.g., verb, content-type, etc). The vertical ellipsis represents that other network access properties, in addition to those expressly listed, may also be accessible to network access abstraction layer 103.

Network access abstraction layer 103 can utilize network access information 123 as input to network security polices 124 to make a network access decision (e.g., network access decision 191) for a network access request (e.g., network access request 194). A network access decision can include a decision to permit a network access request as requested, to permit an adjusted network access request, or to deny a network access request. Adjusting a network access request can include stripping cookies, refusing to send private authentication information, obfuscating header information, etc. Network access abstraction layer 103 can notify a module (e.g., application 114C) of network access decisions corresponding to the module's network access requests.

Referring briefly back to FIG. 1A, when network access is to be permitted, network access abstract layer 103 can send a related request for the requested content to the external computer system (e.g., request 143 to domain 131). When appropriate, the related request can include any adjustments imposed by network access abstraction layer 103 such that the related request reduces the possibility of divulging security information to Web server 132.

Thus, embodiments of the invention permit an application within a security boundary (e.g., sandboxed) to make cross-domain network calls. Cross-domain network calls can be performed in a safe manner through network access abstraction layer 103's application of network security policies 124 to network access information 123.

Embodiments of the invention have been described with respect to Web browser 102 being a host environment and hosting an application within a security boundary. However, it would be apparent to one skilled in the art, after having read this description, that other hosting environments, in addition to those expressly described, can also host networked and/or distributed applications within a security boundary. These other hosting environments can include modules similar to network access abstraction layer 103.

In accordance with the principles of the present invention, a network access abstraction layer within these other hosting environments can utilize network security policies and network access information to regulate inbound and outbound network based communication to and from applications within a security boundary. To facilitate regulation of network based communication in other hosting environments, a network access abstraction layer can make network access decisions when a module, for example, script or other executable code, within a security boundary attempts to communicate with a computer system outside the security boundary or vice versa.

Accordingly, in these other hosting environments, a network access abstraction layer can modify outbound communication sent from an application within a security boundary to a computer system outside of the security boundary. For example, these other hosting environments can determine if network access requests originating within a security boundary are to be permitted. When a network access request is permitted, these other hosting environments can also adjust a related network access request in a manner that does not divulge security information related to other computer systems. Likewise, in these other hosting environments, a network access abstraction layer can modify inbound communication sent from a computer system outside of the security boundary to a module within the security boundary. For example, a network access abstraction layer can strip away a portion of inbound communication to not divulge security information.

Figure 2:
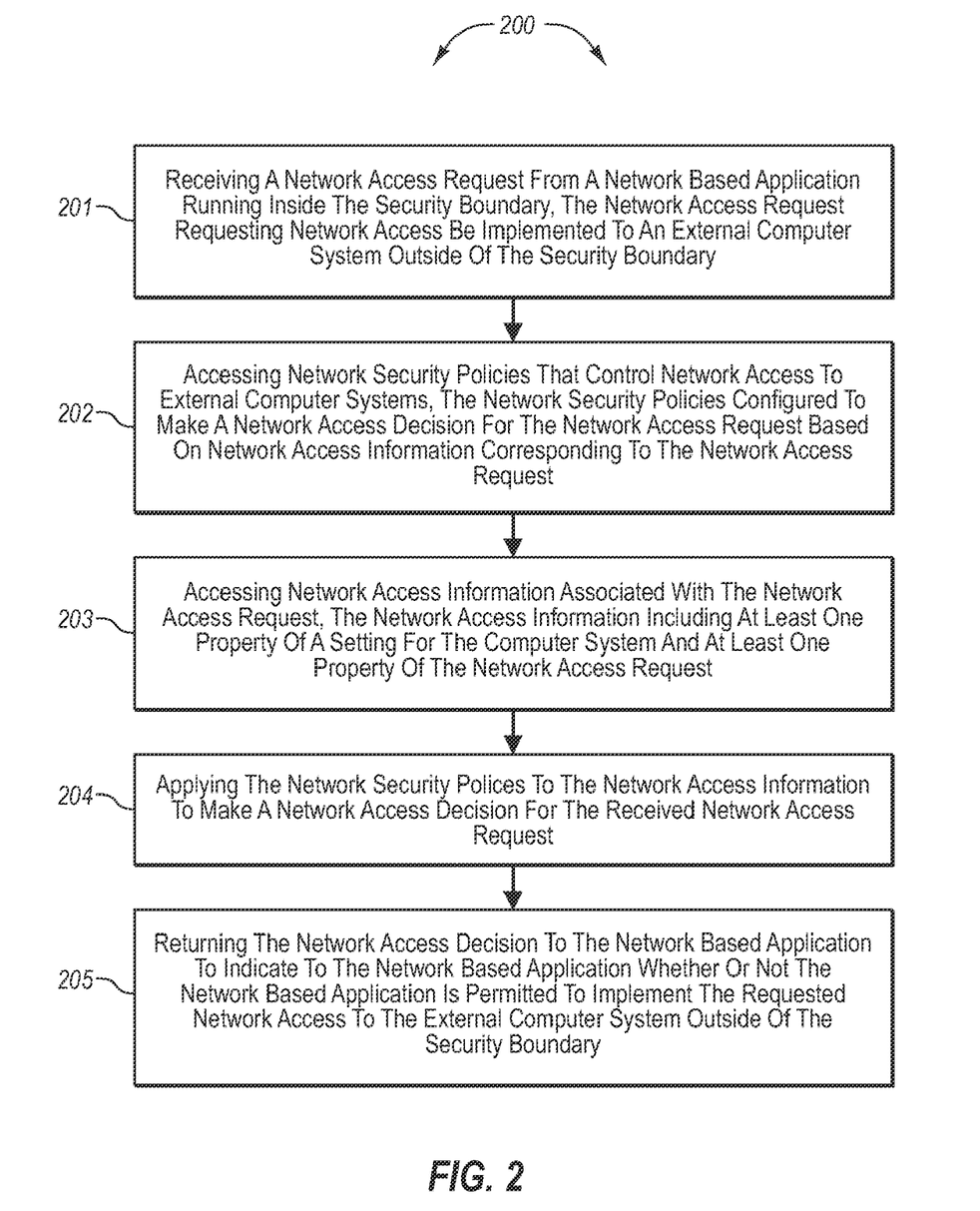
FIG. 2 illustrates a flow chart of an example method for making a network access decision for a module inside a security boundary

FIG. 2 illustrates a flow chart of an example method for making a network access decision for a module inside a security boundary. The method 200 will be described with respect to the components and data of computer architecture 100 depicted in FIGS. 1A and 1B.

Method 200 includes an act of receiving a network access request from a network based application running inside a security boundary, the network access request requesting that network access be implemented to an external computer system outside of the security boundary (act 201). For example, network access abstraction layer 103 can receive network access request 194 from application 114C running within sandbox 106. Network access request 194 can request that networks access be implemented Web server 132 (outside of sandbox 106). For example, application 114C can request to retrieve content from Web server 132.

Method 200 includes an act of accessing network security policies that control network access to external computer systems, the network security policies configured to make a network access decision for the network access request based on network access information corresponding to the network request (act 202). For example, network access abstraction layer 103 can access network security policies 124. Network security policies 124 can be configured to make a network access decision for network operation request 194 based on corresponding network access information. The originating points of the arrow passing through network security policies 124 indicates that different portions of network security policies 124 can be accessed from different locations, such as, for example, within Web browser 102, else where at computer system 101, and/or from locations external to computer system 101.

Method 200 includes an act of accessing network access information associated with the network access request, the network access information including at least one property of a setting for the computer system and at least one property of the network access request (act 203). For example, network access abstraction layer 103 can access network access information 123. Network access information 123 can include at least ambient properties 121 and network access properties 122. The originating points of the arrow passing through network access information 123 indicates that different portions of network access information 123 can be accessed from different locations, such as, for example, within Web browser 102, else where at computer system 101, and/or from locations external to computer system 101.

Method 200 includes an act of applying the network security polices to the network access information to make a network access decision for the received network access request (act 204). For example (now referring specifically to FIG. 1B), network access abstraction layer 103 can apply network security policies 124 to network access information 123 to make a network access decision 191 (for network access request 194). When network security policies 124 include computer-executable instructions, network access abstraction layer 103 can provide appropriate portions of network access information 123 as input to the computer-executable instructions. Network access abstraction layer 103 can apply appropriate logic (e.g., aggregating results, giving preference to override and/or user-entered rules, etc) for making a network access decision based on results from different types of network security policies.

Method 200 includes an act of returning the network access decision to the network based application to indicate to the network based application whether or not the network based application is permitted to implement the requested network access outside of the security boundary (act 205). For example, network access abstraction layer 103 can return network access decision 191 to application 114C to indicate to application 114C whether or not requested network access to Web server 132 is to be permitted.

Figure 3A:
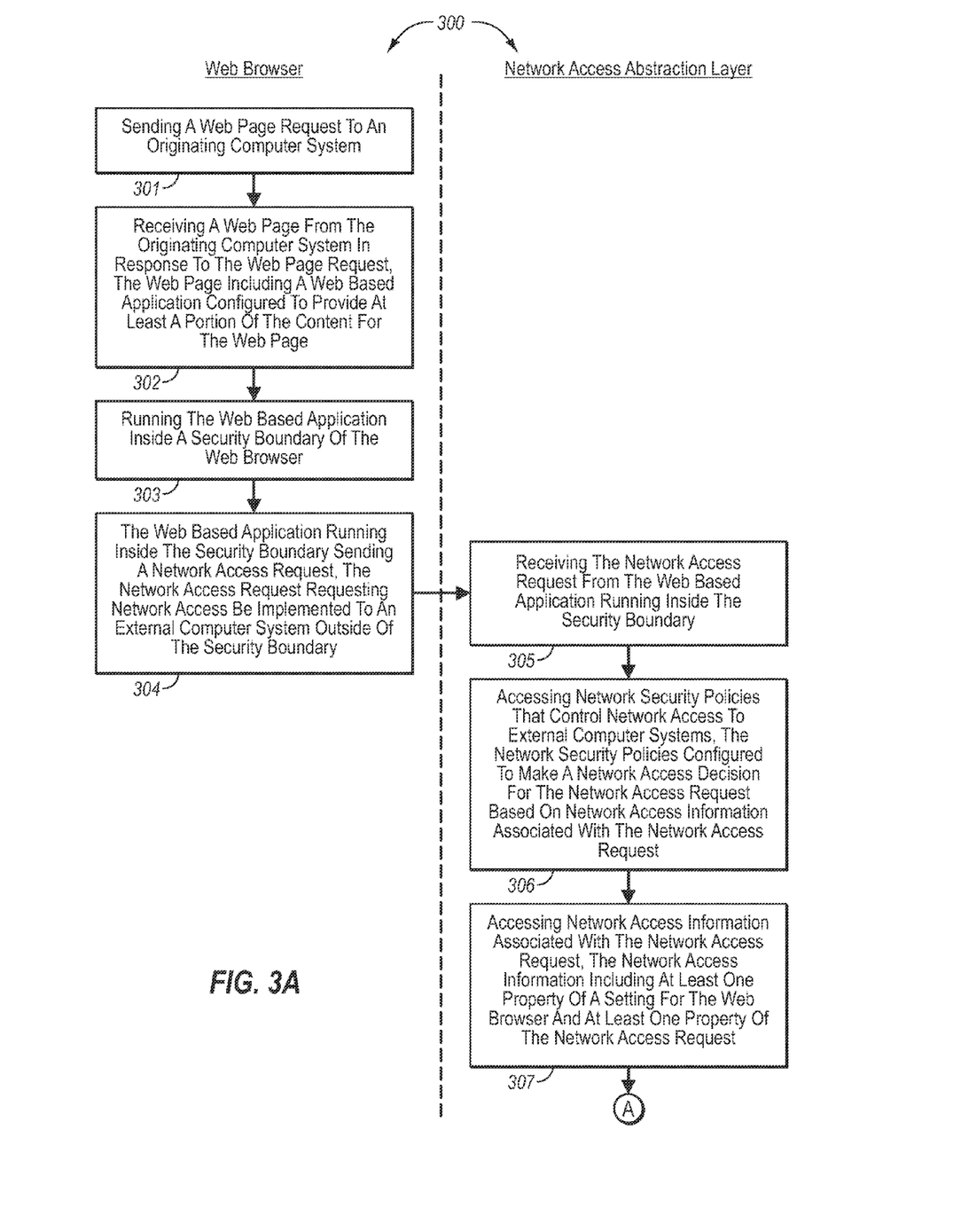
FIGS. 3A and 3B illustrate a flow chart of an example method for permitting a module inside a security boundary to communicate over a network with a computer system outside the security boundary.
Figure 3B:
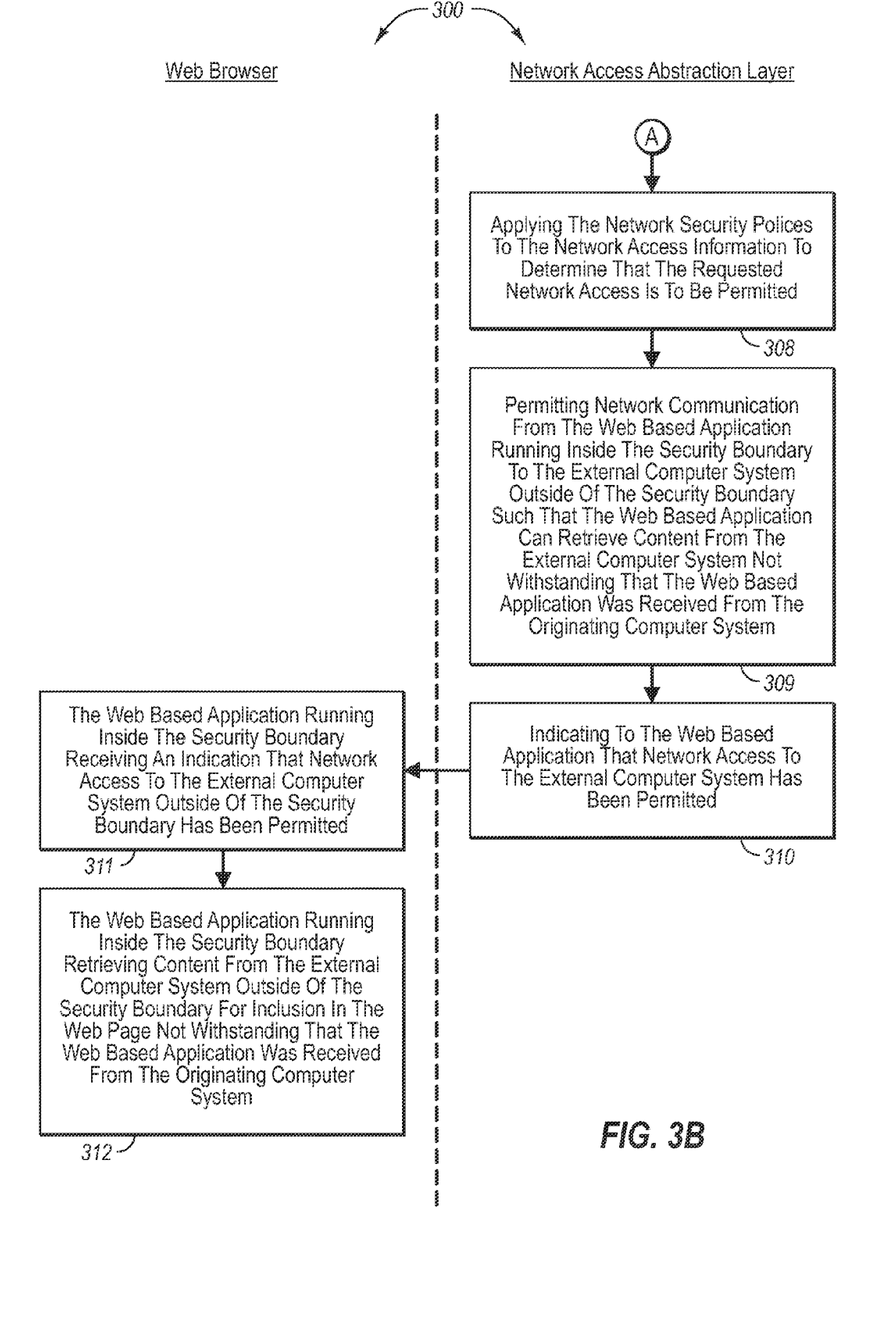

When requested network access is to be permitted (whether as originally requested or when adjusted), network access abstraction layer 103 can provide a requesting application (inside a security boundary) with appropriate content access in a manner that does not divulge security information about computer system 101 and/or Web server 112. FIGS. 3A and 3B illustrate a flow chart of an example method 300 for permitting a module inside a security boundary to communicate over a network with a computer system outside the security boundary. The method 300 will be described with respect to the components and data of computer architecture 100 depicted in FIGS. 1A and 1B.

Method 300 is described with respect to an application within a Web browser host environment communicating with a computer system outside a security boundary. However, method 300 is not limited to the described environment. It should be understood that method 300 is equally applicable to other hosting environments where an application requests content and/or receives content other than Web based content.

Method 300 includes an act of sending a Web page request to an originating computer system (act 301). For example, Web browser 102 can send request 141 to Web server 112. Method 300 includes an act of receiving a Web page from the originating computer system in response to the Web page request, the Web page including a Web based application configured to provide at least a portion of the content for the Web page (act 302). For example, Web browser 102 can receive response 141 from Web server 112 in response to request 141. Response 141 can include a Web page including application 114C (e.g., a client side script). Application 114C can be configured to provide at least a portion of the content for the Web page included in response 142. Method 300 includes an act of running the Web based application inside a security boundary of the Web browser (act 303). For example, Web browser 102 can run application 114C inside sandbox 106.

Method 300 includes an act of the Web based application inside a security boundary sending a network access request, the network access request requesting that a network access be implemented to an external computer system outside of the security boundary (act 304). For example, application 114C, running within sandbox can send network access request 194. Network access request 194 can request that a network access be implemented to Web server 132 (i.e., outside of sandbox 106). For example, application 114C can request content from or request to send content to Web server 132. Method 300 includes an act of receiving the network access request from the Web based application running inside the security boundary (act 305). For example, network access abstraction layer 103 can receive network access request 194 from application 114C running within sandbox 106.

Method 300 includes an act of accessing network security policies that control network access to external computer systems, the network access policies configured to make a network access decision for the network access request based on network access information associated with the network access request (act 306). For example, network access abstraction layer 103 can access network security policies 124. Network security policies 124 can be configured to make a network access decision for network access request 194 based on corresponding network access information. Method 300 includes an act of accessing network access information associated with the network access request, the network access information including at least one property of a setting for the Web browser and at least one property of the network access request (act 307). For example, network access abstraction layer 103 can access network access information 123. Network access information can include at least ambient properties 121 and network access properties 122.

Method 300 includes an act of applying the network security polices to the network access request properties to determine that the requested network access is to be permitted (act 308). For example, network access abstraction layer 103 can apply network security policies 124 to network access information 123 to determine that network access indicated in network access request 194 is to be permitted. Network access abstraction layer 103 can apply appropriate logic (e.g., aggregating results, giving preference to override and/or user-entered rules, etc.) to determine that the network access indicated in network operation request 194 is to be permitted.

Method 300 includes an act of permitting network communication from the Web based application running inside the security boundary to the external computer system outside of the security boundary such that the Web based application can retrieve content from the external computer system notwithstanding that the Web based application was received from the originating computer system (act 309). For example, network access abstraction layer 103 can permit communication (e.g., a cross-domain network call) from application 114C to Web server 132. Thus, application 114C can retrieve content from Web server 132 notwithstanding that application 114C was received from Web server 112.

Method 300 includes an act of an act of indicating to the Web based application that network access to the external computer system has been permitted (act 310). For example, network access abstraction layer 103 can indicate to application 114C that network access (e.g., a cross-domain network call) to Web server 112 has been permitted. Method 300 includes an act of the Web based application running inside the security boundary receiving an indication that network access to the external computer system outside of the security boundary has been permitted (act 311). For example, application 114C can receive the indication that network access (e.g., a cross-domain network call) to Web server 112 has been permitted.

Method 300 includes an act of the Web based application running inside the security boundary retrieving content from the external computer system outside of the security boundary for inclusion in the Web page notwithstanding that the Web based application was received from the originating computer system (act 312). For example, application 114C can retrieve content (e.g., through a cross-domain network call) from Web server 132 notwithstanding that application 114C was received from Web server 112.

In response to permitting network access to Web server 132, network access abstraction layer 103 can formulate request 143 to request the content requested in network access request 194. Request 143 can be similar to a request sent form application 114C to network abstraction layer 103 but can be adjusted so as to not divulge security information of computer system 101 and/Web server 112. Network access abstraction layer 103 can send request 143 to Web server 132.

Web server 132 can receive request 144, and in response, can send response 144 back to network access abstraction layer 103. Response 144 can include the content requested in network access request 143 (e.g., a portion of content 133). Network access abstraction layer 103 can modify response 144 (e.g., stripping Set-Cookie headers) before making response 144 available to application 114C. Network access abstraction layer 103 can then propagate (potentially modified) response 144, including the requested content, back to application 114C for inclusion in a Web page.

Accordingly, embodiments of the present invention can provide modules within a security boundary access to networked resources outside the security boundary in a secure manner. When a module inside a security boundary is permitted network access to content, only those portions of the request needed to access the content are made accessible to computer systems outside of the security boundary. Network access decisions can be made based on ambient data already accessible to a host environment such that network access decisions can be made in a more automated manner.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. At a computer system connected to a network, the computer system including a host environment for running applications, the host environment containing a security boundary that isolates applications run within the security boundary from other portions of the host environment, the host environment also containing a network access abstraction layer outside of the security boundary, the network access abstraction layer configured to determine if network access requests from applications within the security boundary to external network domains comply with network security policies, a method for determining whether or not a network based application running within the security boundary is permitted to access content from an external network domain, the method comprising:

sending a network request to a first external network domain connected to the network, the network request requesting content for presentation in the host environment;

receiving content responsive to the network request from the first external network domain, the content including the network based application, the network based application configured to send a cross-domain network call from the computer system to a second external network domain connected to the network to request further content, the further content for use by the network based application to present the content in the host environment, the second external network domain differing from the first external network domain;

running the network based application received from the first external network domain within the security boundary, the network based application issuing the cross-domain network call to the second external network domain to request the further content, the cross-domain network call requesting access to the second external network domain;

receiving, at the network access abstraction layer, the cross-domain network call from the network based application prior to permitting the cross-domain network call to access the second external network domain;

accessing, at the network access abstraction layer, network security policies, the network security policies defining how to determine whether or not a cross-domain network call from an application within the security boundary to the second external network domain is to be permitted;

accessing, at the network access abstraction layer, network access information associated with the cross-domain network call, the network access information including at least one property of a setting for the computer system and at least one property of the cross-domain network call;

applying, at the network access abstraction layer, the network security policies to the network access information to determine to what extent the cross-domain network call complies with the network security policies; and based on the determination, regulating, at the network access abstraction layer, inbound and outbound communication between the network based application and the second external network domain to provide the further content to the network based application, including:

modifying the cross-domain network call into a second cross-domain network call, the second cross-domain network reducing the privileges being requested for accessing the further content from the second external network domain;

permitting, at the network access abstraction layer, the second cross-domain network call to be sent to the second external network domain to request the further content from the second external network domain;

receiving a response from the second external network domain, the response containing the further content and one or more headers formulated by the second external network domain;

stripping, at the network access information abstraction layer, at least one header from the response; and forwarding the response to the network based application within the security boundary subsequent to stripping the at least one header.

2. The method as recited in claim 1, wherein receiving, at the network abstraction layer, the cross-domain network call comprises receiving a network access request from a client-side script running inside a sandbox.

3. The method as recited in claim 1, wherein receiving, at the network abstraction layer, the cross-domain network call comprises receiving a network access request to request the further content for inclusion in a Web page.

4. The method as recited in claim 1, wherein accessing, at the network abstraction layer, network security policies comprises accessing network security policies including one or more of domain rights, application type access rights, override rules, external program calls, network type access rules, and network location access rules.

5. The method as recited in claim 1, wherein accessing, at the network abstraction layer, network access information associated with the cross-domain network call comprises on act of access ambient information associated with the host environment.

6. The method as recited in claim 1, wherein accessing, at the network abstraction layer, network access information associated with the cross-domain network call comprises accessing network access information including one or more of URL information, trust zone information, system settings, browser settings, network access type, request size, an electronic address, a protocol, and protocol semantics of the protocol.

7. The method as recited in claim 1, wherein applying, at the network abstraction layer, the network security policies to the cross-domain network call comprises providing the network access information as input to computer-executable instructions included in the network security policies.

8. At a computer system connected to a network, the computer system including a Web browser providing a host environment for running Web based applications, the host environment containing a security boundary that isolates applications run within the security boundary from other portions of Web browser, the Web browser also containing a network access abstraction layer outside of the security boundary, the network access abstraction layer configured to determine if network access requests from applications within the security boundary to external network domains comply with network security policies, a method for determining whether or not a Web based application running within the security boundary is permitted to access content from an external network domain, the method comprising:

sending, at the Web browser, a network request to a first external network domain connected to the network, the network request requesting content for presentation at the Web browser;

receiving content responsive to the network request from the first external network domain, the content including the Web based application, the Web based application configured to send a cross-domain network call from the computer system to a second external network domain connected to the network to request further content, the further content for use by the Web based application to present the content at the Web browser, the second external network domain differing from the first external network domain;

running the Web based application received from the first external network domain within the security boundary, the Web based application issuing the cross-domain network call to the second external network domain to request the further content, the cross-domain network call requesting access to the second external network domain;

receiving, at the network access abstraction layer, the cross-domain network call from the Web based application prior to permitting the cross-domain network call to access the second external network domain;

accessing, at the network access abstraction layer, network security policies, the network security policies defining how to determine whether or not a cross-domain network call from an application within the security boundary to the second external network domain is to be permitted;

accessing, at the network access abstraction layer, network access information associated with the cross-domain network call, the network access information including at least one property of a setting for the Web browser and at least one property of the cross-domain network call;

applying, at the network access abstraction layer, the network security policies to the network access information to determine to what extent the cross-domain network call complies with the network security policies; and based on the determination, regulating, at the network access abstraction layer, inbound and outbound communication between the Web based application and the second external network domain to provide the further content to the Web based application, including:

modifying the cross-domain network call into a second cross-domain network call, the second cross-domain network reducing the privileges being requested for accessing the further content from the second external network domain;

permitting, at the network access abstraction layer, the second cross-domain network call to be sent to the second external network domain to request the further content from the second external network domain;

receiving a response from the second external network domain, the response containing the further content and one or more headers formulated by the second external network domain;

stripping, at the network access information abstraction layer, at least one header from the response; and forwarding the response to the Web based application within the security boundary subsequent to stripping the at least one header.

9. The method as recited in claim 8, wherein receiving, at the network abstraction layer, the cross-domain network call comprises receiving a network access request from a client-side script running inside a sandbox.

10. The method as recited in claim 8, wherein receiving, at the network abstraction layer, the cross-domain network call comprises receiving a network access request for content to be included in a Web page.

11. The method as recited in claim 8, wherein accessing, at the network abstraction layer, network security policies comprises:

presenting a user-interface control prompting a user to enter a network security policy related to the network access request; and receiving user-input data through the user-interface control, the user-input data indicative of the network security policy related to the network access request.

12. The method as recited in claim 8, wherein accessing, at the network abstraction layer, network access information associated with the cross-domain network call comprises an act accessing a browser setting of the Web browser that persists across multiple network access requests.

13. A computer program product for use at a computer system connected to a network, the computer system including a host environment for running applications, the host environment containing a security boundary that isolates applications run within the security boundary from other portions of the host environment, the host environment also containing a network access abstraction layer outside of the security boundary, the network access abstraction layer configured to determine if network access requests from applications within the security boundary to external network domains comply with network security policies, the computer program product for implementing a method for determining whether or not a network based application running within the security boundary is permitted to access content from an external network domain, the computer program product comprising one or more computer storage devices having stored thereon computer executable instructions that, when executed at a processor, cause the computer system to perform the method, including the following:

sending a network request to a first external network domain connected to the network, the network request requesting content for presentation in the host environment;

receiving content responsive to the network request from the first external network domain, the content including the network based application, the network based application configured to send a cross-domain network call from the computer system to a second external network domain connected to the network to request further content, the further content for use by the network based application to present the content in the host environment, the second external network domain differing from the first external network domain;

running the network based application received from the first external network domain within the security boundary, the network based application issuing the cross-domain network call to the second external network domain to request the further content, the cross-domain network call requesting access to the second external network domain;

receiving, at the network access abstraction layer, the cross-domain network call from the network based application running inside the security boundary prior to permitting the cross-domain network call to access the second external network domain;

accessing, at the network access abstraction layer, network security policies, the network security policies defining how to determine whether or not a cross-domain network call from an application within the security boundary to the second external network domain is to be permitted;

accessing, at the network access abstraction layer, network access information associated with the cross-domain network call, the network access information including at least one property of a setting for the computer system and at least one property of the cross-domain network call;

applying, at the network access abstraction layer, the network security policies to the network access information to determine to what extent the cross-domain network call complies with the network security policies; and based on the determination, regulating, at the network access abstraction layer, inbound and outbound communication between the network based application and the second external network domain to provide the further content to the network based application, including:

modifying the cross-domain network call into a second cross-domain network call, the second cross-domain network reducing the privileges being requested for accessing the further content from the second external network domain;

permitting, at the network access abstraction layer, the second cross-domain network call to be sent to the second external network domain to request the further content from the second external network domain;

receiving a response from the second external network domain, the response containing the further content and one or more headers formulated by the second external network domain;

stripping, at the network access abstraction layer, at least one header from the response; and forwarding the response to the network based application within the security boundary subsequent to stripping the at least one header.

14. The computer program product as recited in claim 13, wherein stripping, at the network access abstraction layer, at least one header from the response comprises stripping a Set-Cookie header from the response.

15. The method as recited in claim 1, wherein stripping, at the network access abstraction layer, at least one header from the response comprises stripping a Set-Cookie header from the response.

* * * * *